Jan. 26, 1965    N. R. BROWNYER    3,167,158
AUTOMATIC BRAKE SYSTEM
Filed Aug. 23, 1961    7 Sheets-Sheet 1

INVENTOR.
Nelson R. Brownyer

BY
*Strauch Nolan + Neale*
ATTORNEYS

Jan. 26, 1965

N. R. BROWNYER 3,167,158

AUTOMATIC BRAKE SYSTEM

Filed Aug. 23, 1961

INVENTOR.
Nelson R. Brownyer

BY
Strauch, Nolan & Neale
Attorneys

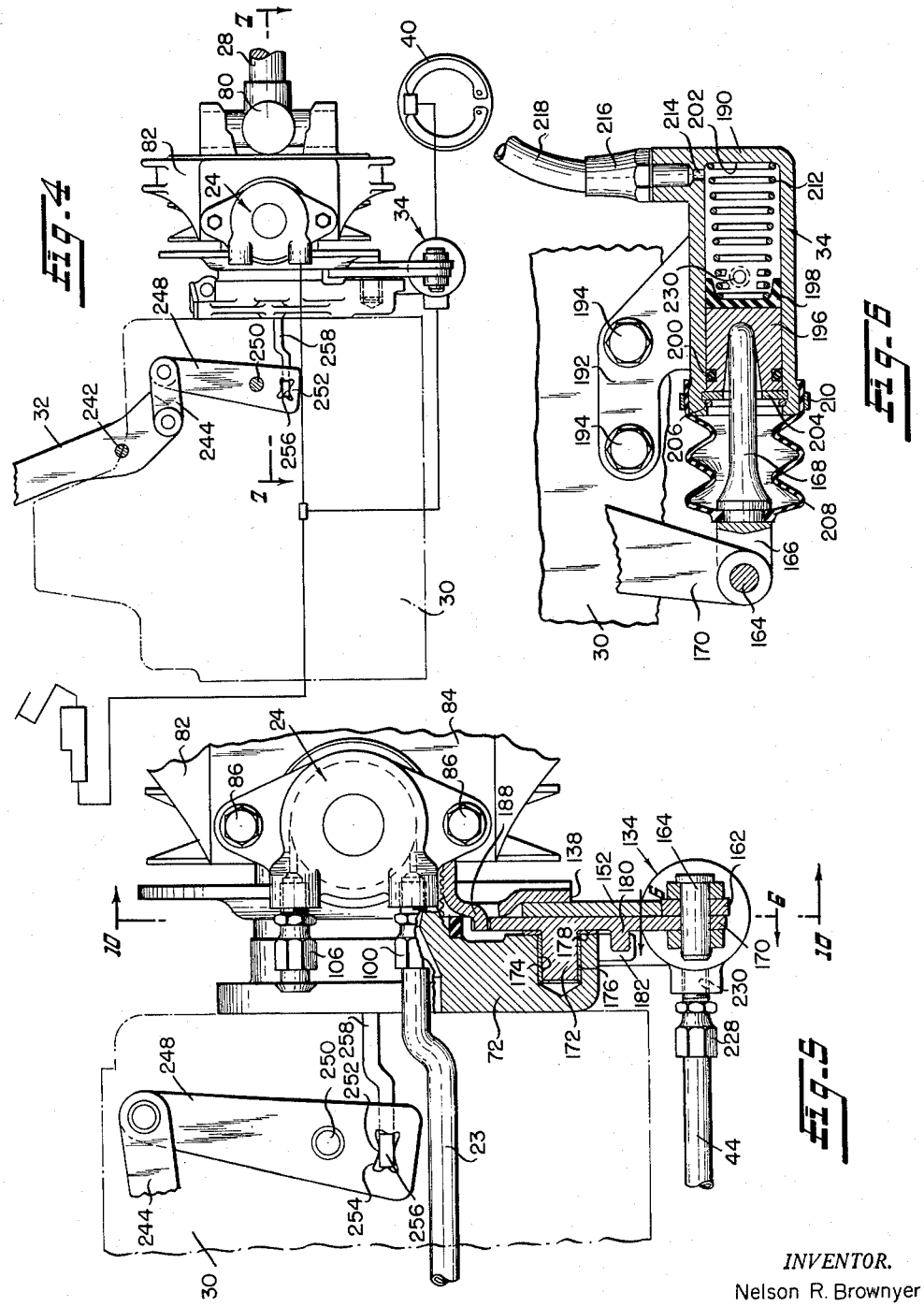

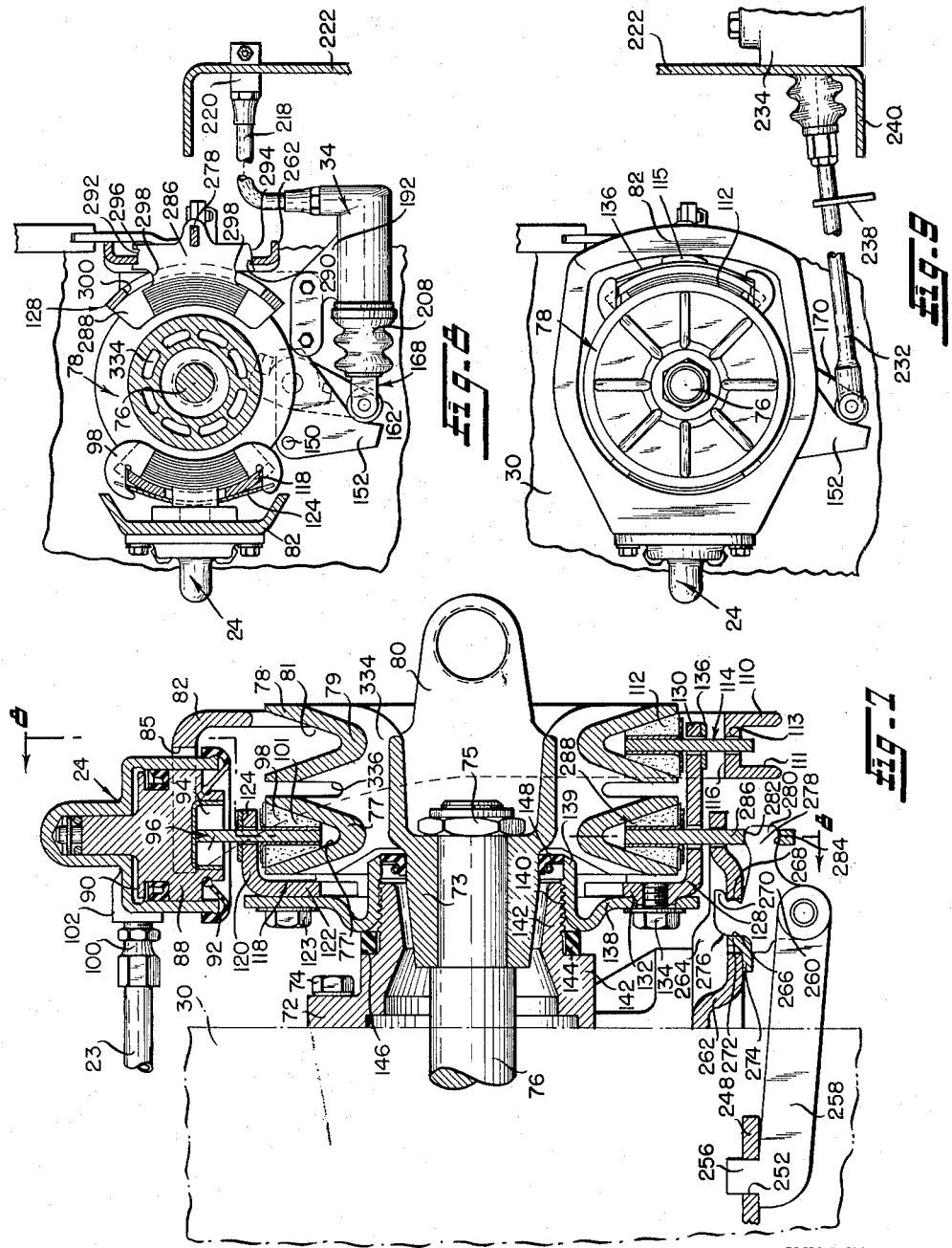

Jan. 26, 1965  N. R. BROWNYER  3,167,158
AUTOMATIC BRAKE SYSTEM
Filed Aug. 23, 1961  7 Sheets-Sheet 5

INVENTOR.
Nelson R. Brownyer
BY
Strauch, Nolan & Neale
ATTORNEYS

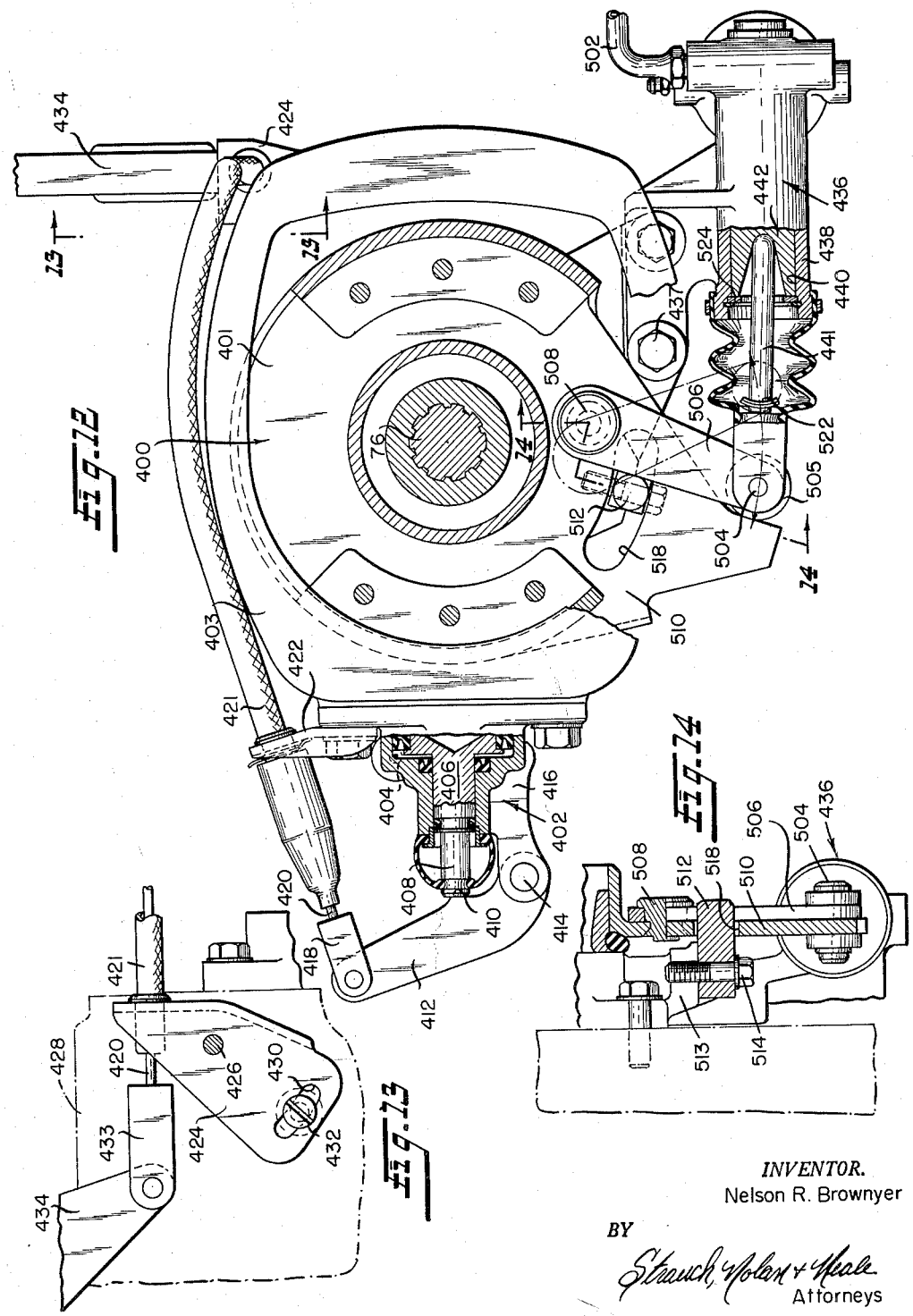

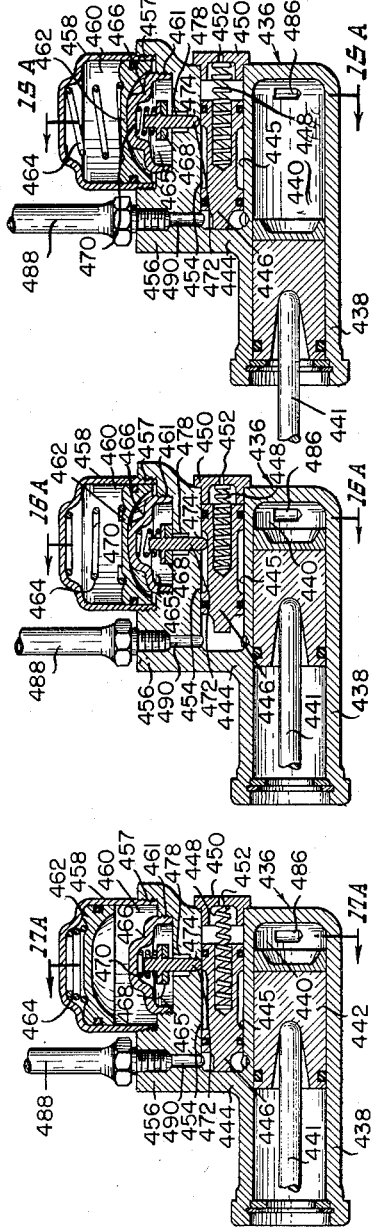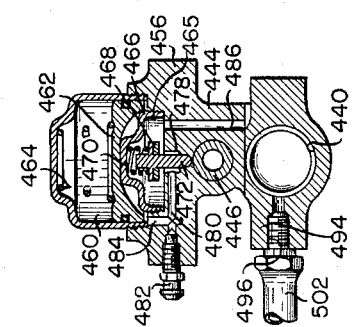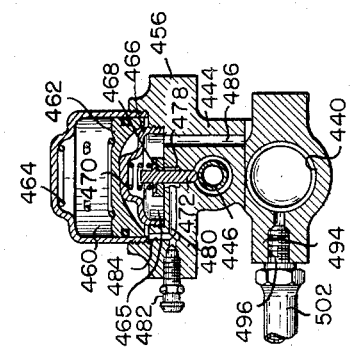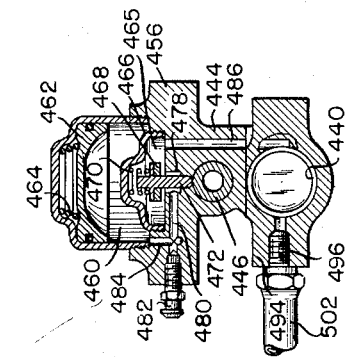
Jan. 26, 1965     N. R. BROWNYER     3,167,158
AUTOMATIC BRAKE SYSTEM
Filed Aug. 23, 1961     7 Sheets-Sheet 7
*INVENTOR.*
Nelson R. Brownyer
BY
Attorneys 3,167,158
AUTOMATIC BRAKE SYSTEM
Nelson R. Brownyer, Birmingham, Mich., assignor to Rockwell-Standard Corporation, Coraopolis, Pa., a corporation of Pennsylvania
Filed Aug. 23, 1961, Ser. No. 133,348
15 Claims. (Cl. 188—141)

The present invention refers to automotive braking systems in general and in particular to a power braking system for a roadway vehicle.

It has become increasingly apparent that many hitherto conventional braking systems for motor vehicles are inadequate in that a relatively large amount of pedal pressure is required to effectively apply the brakes and bring the vehicle to a stop. Since it has not been feasible or practical to further increase the actual brake diameter or braking surface area in the wheel brakes, air or vacuum operated booster and like added power mechanisms have been devised to multiply the exerted braking force and thereby effectuate maximum retarding action without undue slip or skidding. This provides safe and quick braking, especially in heavy motor vehicles, and it also considerably prolongs the life of the brake linings. Furthermore, driver fatigue is reduced since the physical effort required to apply the brakes is relatively light in comparison with the actually applied braking force due to the multiplication by the booster mechanism. But such known booster or power brake mechanisms are usually expensive and they have other disadvantages such as installation and space problems, increased maintenance chiefly due to complicated valving, and they sometimes require added horsepower in the vehicle engine.

In order to eliminate the comparably high cost of a conventional power brake system it has been proposed to provide a braking assist to the usual wheel brakes in the form of an additional brake, as for instance by using the existing transmission or propeller shaft brake which is ordinarily being used only as a hand operated emergency or parking brake. As a service brake the propeller shaft brake could be connected to the wheel brake system and by suitable mechanism simultaneously operated with the wheel brakes by the brake pedal. This arrangement is however objectionable in that a potential hazard is created by scuffing the gear teeth in the rear axle drive on the coast side of the teeth due to the high brake torque transmitted through the propeller shaft and gearing during vehicle movement.

Other arrangements are known in which the motion of the vehicle is utilized to directly or indirectly augment the braking action, as for instance proposed in U.S. Patents 1,923,463, Tatter et al., 2,206,976, Rossmann, and 2,258,855, La Brie. The above mentioned patents provide the use of a brake connected to the drive shaft of the vehicle and whose reaction forces are utilized to augment the fluid pressure in the braking system by means of mechanically developed force created in the drive line brake independent of the physical force exerted on the brake pedal. Those prior constructions embodied certain disadvantages of which complexity, high cost and constant maintenance are the most important and the present invention has for an object to provide a simplified, improved mechanism of the above type of brake system.

Still other arrangements have been proposed in which the torque reaction of one of the wheel brakes is utilized to actuate the remaining wheel brakes of the vehicle, as for instance disclosed in U.S. Patent 2,147,082, C. Beusch, and 2,975,871, K. Eckardt et al. Those constructions do not actually augment the initial pressure in the system applied by depressing the foot pedal since only one brake is directly connected to the foot pedal pressure system and the remaining brakes receive their application force solely from the torque reaction of the first brake. The inherent disadvantages of this system are as follows: one wheel has to be locked first in order to gain force to apply the other brakes, which may result in the skidding of the vehicle; heavier brake linings have to be used for the first brake; the entire construction of the first brake is heavier than the remaining brakes due to the incorporated torque arm mechanism creating an unbalance which has to be compensated for; brakes cannot be operated when the pressure system or torque arm mechanism fails.

The present invention provides a simplified improved system of a power brake mechanism which effectively overcomes the foregoing disadvantages and which consists in general in the utilization of the torque reaction of one brake in the drive line of the vehicle to boost or augment the pedal pressure in the vehicle braking system. In the present invention this arrangement has been illustrated and described in connection with a propeller shaft or drive line brake which is or can conveniently be installed in most commercial vehicles. Although it has been stated previously that using the propeller shaft brake as a service brake is in general objectionable because of reduced torque capacity of the gear teeth when operating on the coast side of the teeth during braking action, the arrangement in the present invention is such that only ⅓ of the maximum brake torque is transmitted through the propeller shaft and gearing. If it is assumed, for instance, that in a conventional vehicle the brake distribution is 25 to 75, that is, 25% for the total of the two rear wheel brakes, the rear brake distribution in the vehicle of the invention could be 25% on each rear wheel brake and 25% on the propeller shaft brake. Thus the life of the rear wheel brakes may be considerably extended or smaller size wheel brakes and cylinders may be incorporated. The advantage of this arrangement from a viewpoint of cost is obvious. The duty on the propeller shaft brake when used as a service brake is comparatively low compared to the input when used as an emergency or parking brake, thus, a small increase in the thermal capacity would allow for a frequent use of this brake as a part of the service brake system without requiring brake relining more frequently than the rear wheel brakes. Provision may be made to maintain use of this same brake as an emergency or parking brake, as is conventional practice, independently of and not affecting the service brake system.

However, the above advantages attained by incorporation of the propeller shaft brake into the service brake system does not in itself provide a power braking action which is desired in many applications. Consequently, the present invention provides, furthermore, an arrangement in which the reaction force of one brake is utilized to augment the pressure actuation of the remaining brakes so that in fact the input required into this one brake is very small compared to the actual total braking force exerted on all brakes.

The preferred illustrated arrangement of the propeller shaft or drive line brake consists of a disk or shoe brake on the propeller shaft or any other location in the vehicle drive line rearwardly of the vehicle transmission, and which may be provided with a hand lever attachment for manual actuation as an emergency or parking brake. The torque reaction of a conventional brake is usually absorbed by the mounting bracket with which the stationary parts of the brake are attached to the transmission housing or other stationary parts of the vehicle. The present invention makes use of this torque reaction to actuate or augment actuation of the wheel brakes by connection to a rotatable bracket instead of the usual rigid bracket. This rotatable bracket, which constitutes a lever, is connected through a linkage or directly to a power cylinder adapted to exert pressure to intensify the direct braking action. Where the power brake mechanism is incorporated with the parking brake, separate brake shoes are provided for the service brake hookup which are operated independently of the parking or emergency brake shoe or shoes.

Upon depression of the brake pedal the drive line brake is simultaneously applied, and the force produced by brake torque reaction in the drive line brake will be conveyed by the rotatable bracket and linkage to the power cylinder which essentially functions to directly actuate the wheel cylinders of the remaining brakes, or intensifies the wheel brake actuation thus providing an automatic power braking system. The brake torque delivered to the rear wheels from the drive line brake when used as the power brake in the above manner could reduce the torque required of the rear wheel brakes to about two-thirds of the torque required in conventional braking systems. The one-third of the rear axle braking that is obtained through the application of the drive line brake is achieved at very low physical effort because of having the benefit of multiplied torque through the rear axle gear ratio. The arrangement may be such that where the propeller shaft brake is used as the power brake the ordinary manual operation of the propeller shaft brake for use as parking or emergency brake will in no way be impaired by the power brake hookup. It is, furthermore, preferred to provide means to bypass the drive line power brake in case of propeller shaft failures in which case the wheel brakes can be still actuated directly. In general, although a drive line brake hookup is preferred, it is possible to use any other brake situated elsewhere on the vehicle for the same purpose.

The braking system of the present invention is equally effective in forward or reverse rotation by providing equal line pressure and torque regardless of direction of rotation.

Accordingly, it is the major object of the present invention to provide a novel vehicle braking system in which the torque reaction of one vehicle brake is utilized to exert increased force to apply other brakes.

Another object of the invention is the provision of a novel vehicle braking system in which the torque reaction of one brake is connected by rotary motion transmitting linkage to a power cylinder which imparts pressure to the wheel brake hydraulic system.

Still another object of the present invention is to provide a novel vehicle braking system in which a brake located in the drive line of the vehicle either ahead or in rear of the gear reduction is so constructed and arranged as to convey its torque reaction when operated to actuate a power cylinder which actuates or augments actuation of the remaining vehicle brakes.

A further object of the present invention is to provide in a vehicle braking system a propeller shaft or transmission brake so connected to the service brake system as to automatically provide pressure actuation of the vehicle wheel brakes.

A still further object of the present invention is to provide in a vehicle a propeller shaft or transmission brake assembly actuated by depression of a pedal and having a rotatably mounted torque reaction member which is connected to control actuation of a power cylinder in the vehicle wheel brake system.

Still another object of the invention is the provision of a propeller shaft or transmission brake assembly which is connected by mechanical linkage or hydraulically to the brake pedal and which is utilized as part of the vehicle brake system to actuate the wheel brakes by means of brake torque reaction forces derived therefrom.

A further object of the invention is to provide a novel vehicle braking system including a propeller shaft or transmission brake which is so connected into the vehicle brake system as to provide added brake power and in such a way that brake torque distribution between both rear wheel brakes and propeller shaft or transmission brake is substantially equal.

Another object of the invention is to use the propeller shaft brake in a vehicle braking system as a power brake to reduce the physical braking effort required to apply the wheel brakes.

Still another object of the invention is the provision of a novel power brake system for vehicles which is equally effective in both forward and reverse rotation and which requires a small power input compared to the actual force exerted at the wheel brakes.

A further object of the present invention is to provide a power brake system for vehicles which utilizes already available components in the vehicles brake system to the best advantages and eliminates the disadvantages of vacuum or air operated conventional booster or power brake mechanisms.

Another object is the provision of a power braking means in a novel vehicle brake system in line with the service brake hookup and arranged to actuate or augment actuation of the vehicle wheel brakes provided with bypass means so that in case of propeller or axle shaft failure the wheel brakes may be directly actuated by the brake pedal.

Other objects and novel features will become apparent from the following detailed description and claims in connection with the appended drawings in which:

FIGURE 4 is a fragmentary side elevation partly in section of a propeller shaft or transmission brake shown as connected into the system of FIGURE 1;

FIGURE 5 is an enlarged fragmentary side view partly in section showing detail of the brake of FIGURE 4;

FIGURE 6 is a section through the power cylinder substantially along line 6—6 of FIGURE 5;

FIGURE 7 is an enlarged section through the brake and associated parts substantially along 7—7 of FIGURE 4;

FIGURE 8 is a section through the plan of the brake along line 8—8 of FIGURE 7;

FIGURE 9 is a rear elevation of the brake of FIGURE 7 showing a mechanical linkage arrangement to operate a remotely installed power cylinder;

FIGURE 12 is a section like FIGURE 10 but illustrating a further brake embodiment wherein opposite brake shoes coact with a single drum in the invention;

FIGURE 13 is a fragmentary detail in section on line 13—13 in FIGURE 12 showing the cable to lever connection;

FIGURE 14 is a fragmentary view partly in section on line 14—14 of FIGURE 12 showing torque transmitting connections;

FIGURES 15, 15a, 16, 16a, 17 and 17a are fragmentary sectional views showing details of structure and operation of the booster cylinder for the particular brake embodiment shown in FIGURE 12.

Figure 3:
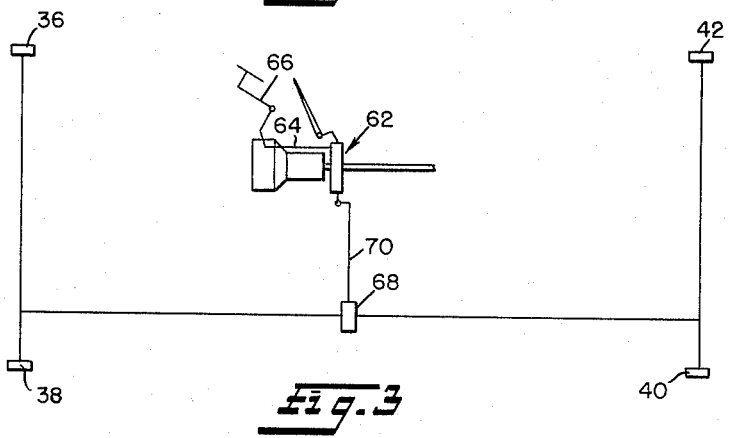
FIGURE 3 is a diagrammatic illustration of still another embodiment of the present invention similar to that of FIGURE 1 but employing mechanical actuation of the propeller shaft brake rather than hydraulic.
Figure 3A:
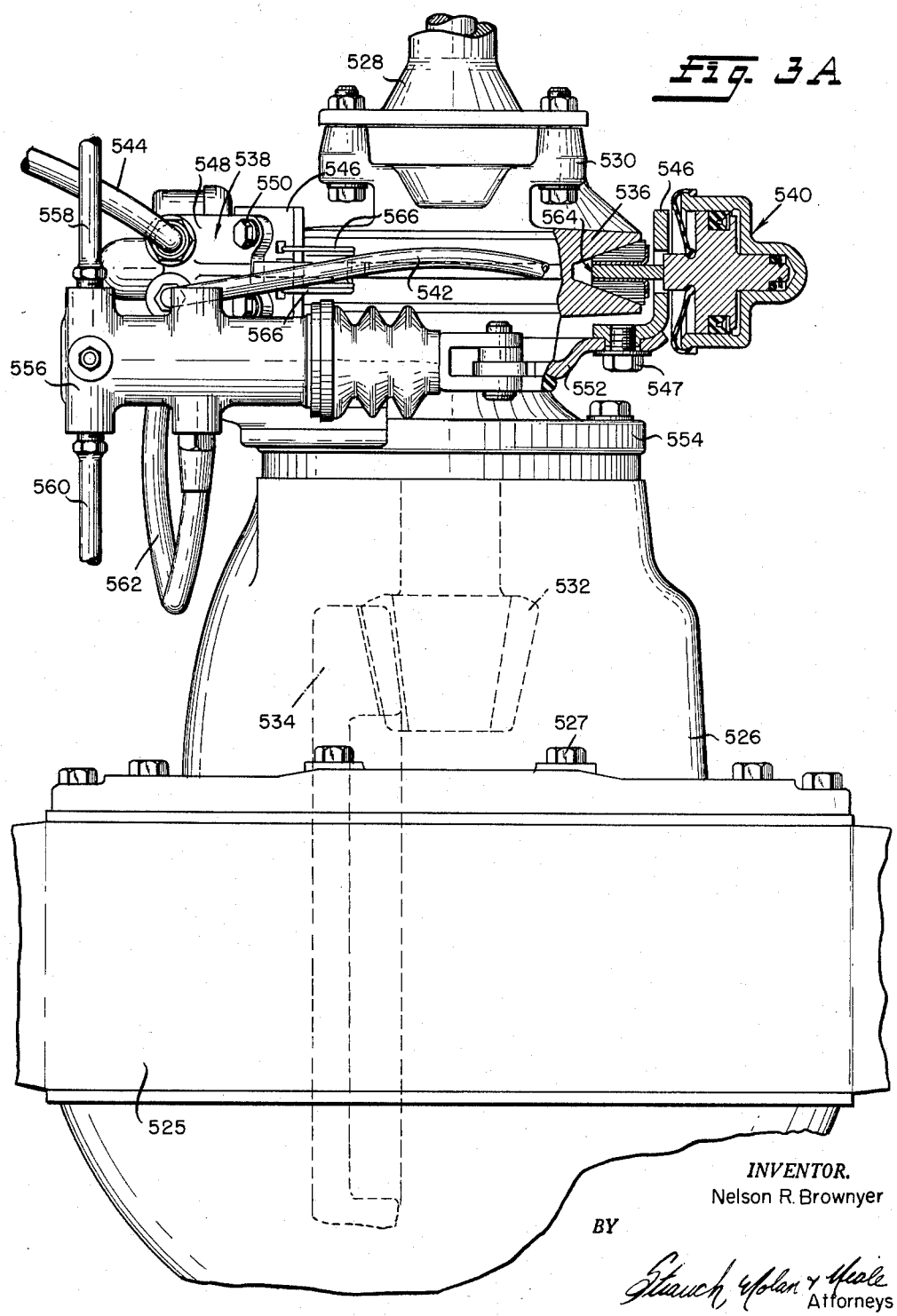
FIGURE 3a is a fragmentary view of a preferred installation and embodiment of the drive line brake used as the power booster which is attached to the input shaft of the rear axle final drive assembly.

Although all three brake embodiments in FIGURES 3a, 4 and 12 of the present invention are illustrated as incorporating an externally V-grooved disc brake it should be understood that any other type of brake may be employed to the same effect as, for instance, a band brake, disc type brake, or internal shoe brake.

Figure 1:
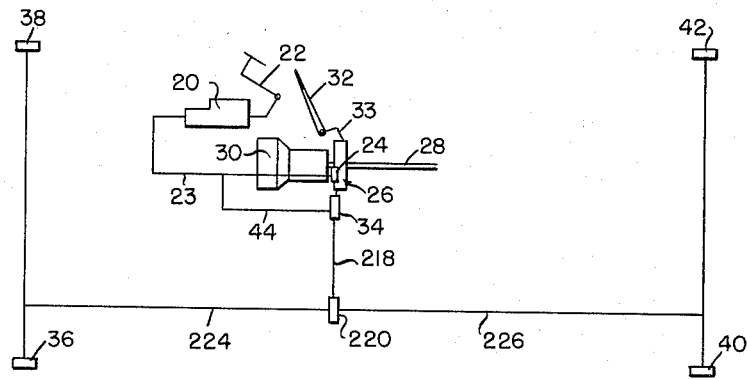
FIGURE 1 is a diagrammatic illustration showing one embodiment of the present novel vehicle braking system wherein the propeller shaft or transmission brake torque reaction is transferred to the wheel brakes.

FIGURE 1 shows diagrammatically a vehicle braking system incorporating a conventional hydraulic master cylinder 20 operated by the usual foot pedal 22. Master cylinder 20 is connected by conduit 23 to a hydraulic cylinder 24 to actuate a brake 26 disposed around a propeller shaft 28 or transmission output shaft at the rear of a transmission 30. A pivoted hand lever 32 is connected by linkage 33 to actuate a separate and independent shoe (288 in FIGURE 7) for emergency and parking as usual. Mechanism is provided whereby operation of cylinder 24 will not disturb lever 32 and its linkage. Brake 26 has a rotatable mounting, as will be fully described, moved in response to brake torque reaction and connected to actuate a hydraulic power cylinder 34 which in turn is connected by conduits to both front wheel brakes 36 and 38 and rear wheel brakes 40 and 42.

This arrangement may be such that in fact the brake 26 when applied by pressure on pedal 22 delivers power to actuate as sole power transmission the remaining brakes. This power delivering effect of the one brake together with the advantages of the gear reduction in the rear axle through the propeller shaft mounted brake greatly reduces the physical force necessary for adequate brake application which in effect provides a power brake system, but for all practical purposes a by-pass 44 is provided from conduit 23 to power cylinder 34 to provide initial fluid pressure to the wheel brakes simultaneously with the actuation of brake 26 which in addition provides a safety feature in case of propeller shaft or transmission failure or a failure at brake 26.

Figure 2:
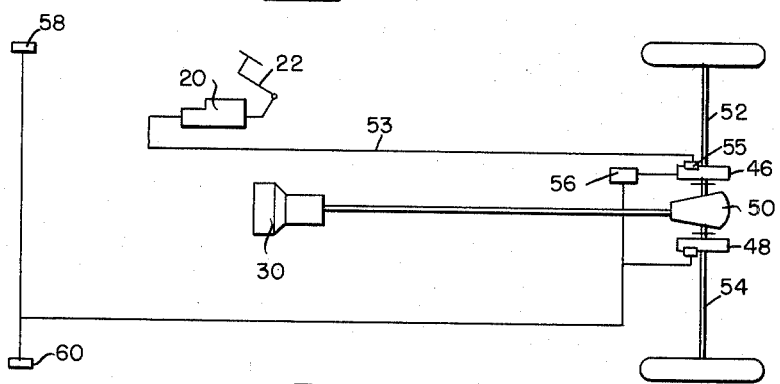
FIGURE 2 is a diagrammatic illustration showing the invention in another embodiment as applied to a vehicle having independent rear wheel suspension.

In FIGURE 2 the system of the invention is incorporated in a vehicle having independent rear wheel suspension where the wheel brakes 46 and 48 are attached adjacent the final drive housing 50 to act on the axle shafts 52 and 54, respectively. In this instance the pedal actuated master cylinder 20 is connected by conduit 53 to a hydraulic cylinder 55 at one wheel brake 46 which is rotatably mounted similarly to brake 26 and connected to actuate a hydraulic power cylinder 56 which in turn is connected to the other rear wheel brake 48 and front wheel brakes 58 and 60, respectively. Although in this embodiment there is no advantage of the gear reduction, only the physical force to actuate the one brake is necessary to actuate all other brakes by means of the utilized torque reaction of that one brake but for the same reason as stated before the master cylinder 20 may be connected to all four wheel brakes in which case the one brake 46 is utilized to augment the brake actuation in the system.

FIGURE 3 schematically illustrates the form of the invention embodying mechanical operation of a power delivering propeller shaft brake 62 which in this instance is actuated by a mechanical linkage 64 connected directly to the brake pedal 66. The hydraulic power cylinder 68 may be mounted remote from the brake 62 and actuated therefrom by a linkage 70. This arrangement is shown more in detail in FIGURES 9 and 11. Power cylinder 34 of the embodiment of FIGURE 1 may be located and operated similarly to the manner shown in responding to the system of FIGURE 3;

With reference to FIGURE 3a the power brake in this embodiment is attached to the final drive carrier and does not include the manual parking brake which may be mounted elsewhere on the vehicle. A drive axle housing 525 is open forwardly to receive a differential carrier housing 526, secured thereto as by bolts 527. The vehicle propeller shaft 528 is connected to the final drive flange 530 to rotate a customary pinion 532 and ring gear 534 representing a conventional differential assembly.

The brake drum 536 comprising an external V-grooved disc is rigid with drive flange 530 and rotates with the transmission gearing. Two identical and opposite fluid cylinders 538 and 540 are mounted on the assembly with the interiors of their cylinders connected by a conduit 542 so that they are simultaneously actuated when the hydraulic fluid pressure is supplied through conduit 544 connected to the master cylinder 20.

Cylinders 538 and 540 are attached, as by flanges 548 and bolts 550, to identical brake shoe mounting brackets 546, as shown on the left in FIGURE 3a. This dual cylinder arrangement eliminates the need for a floating strut such as that at 82 in FIGURE 7. In turn brackets 546 are attached, as by fasteners 547, to a torque plate assembly 552 which is rotatably mounted on a stationary carrier housing part as at 554 and adapted to rotate about the pinion shaft axis.

A power cylinder 556 is attached to the carrier housing and this cylinder may be identical with that at 34 described further on in connection with FIGURE 6 except that two outlets 558 and 560 are provided connected respectively to the front and rear wheel brakes. A by-pass conduit 562 is provided between primary cylinder 538 and the pressure chamber of power cylinder 556 to initially actuate the wheel brakes in a manner to be described later on in connection with FIGURES 4 to 10 and also provides a safety feature in case of failure in the vehicle drive mechanism, similar to by-pass conduit 44 in FIGURE 1.

In this embodiment, instead of the leaf brake shoe return springs illustrated at 124, 136 in the embodiment of FIGURES 4 to 10, I provide coil torsion return springs 566 at both ends of the brake shoes 564, each spring 566 being attached to one end to a shoe 564 and at its other end to a bracket 546.

In this embodiment, therefore, each primary hydraulic cylinder for applying a brake shoe to the drum rotating with the driven pinion shaft is mounted on a bracket fixed upon the rotatably mounted torque plate.

The foregoing preferred power brake structure of FIGURE 3a enables the power brake to be effective even when the engine is stalled and no power is applied to the propeller shaft, or when the propeller shaft may be broken, the mechanism operates as follows:

Upon application of pressure on foot pedal 22 master cylinder 20 will be actuated to transfer this pressure through conduit 544 into cylinder 538 from which it is conveyed via conduit 542 to opposite cylinder 540 to simultaneously apply brake shoes 564 to retard and stop rotation of brake drum 536. At the same time pressure is conveyed from cylinder 538 via conduit 562 into the power cylinder 556 to actuate the same to transfer pressure to the wheel brakes by means of conduits 558 and 560. Instantaneously upon actuation of the drive line power brake pressure within the power cylinder 556 will be mechanically augmented to a considerable extent by means of the force derived from the torque plate 552 which starts to rotate in the direction of brake drum rotation when brake shoes 564 are applied and thereby moves a piston in power cylinder 556 in line with the pressure in the system. Torque plate actuation may be in a manner illustrated and described further on in connection with FIGURES 6, 10 and 12. By movement of the piston within power cylinder 556 the conduit 562 which connects the power cylinder with the master cylinder 20 via brake cylinder 538 and conduit 544 are gradually closed so that the final brake application and holding power is solely provided by the torque reaction force of the drive line power brake. This feature, which will be more in detail described later on, prevents an undesirable build-up in the system and likewise automatically releases pressure on the foot pedal and lets the vehicle operator feel to what extent his brakes are applied. Thus, a minimum physical effort is required to effectively and instantly apply all brakes.

Release of the brakes is accomplished by relieving pressure on foot pedal 20 which causes all parts to be returned to their original inactive positions by means of conventional return springs embodied in the mechanism and which need not further be described.

This embodiment of the power brake is a preferred construction for reasons that it may be installed without undue alterations on the original vehicle structure and without changes in the original manual parking brake mechanism, usually provided on the propeller or transmission shaft. Another important advantage is that the brake is operable at all times as long as the vehicle is in motion whether or not there is power transmission from the engine due to its connection to the pinion shaft of the final wheel drive mechanism.

The following embodiments are feasible constructions although they require specific parking brake structures.

FIGURES 4-10 show the transmission or propeller shaft brake of FIGURE 1 in detail. A vehicle transmission 30 extends longitudinally of the vehicle and has attached thereto at the rear, as by screws 74 (FIGURE 7) a bearing and shaft support 72. Transmission output shaft 76 extends through support 72 (FIGURE 7) into brake assembly 26. The hub 73 of brake drum 78 is fixed on the reduced end of shaft 76, as by nut 75.

Brake drum 78 comprises dual V-grooved side by side discs 77 and 79 integral or attached to each other and hub 73 and having an integral connecting yoke 80 to couple to propeller shaft 28 (FIGURE 4).

Brake drum 78 is surrounded by a floating bracket 82 which has a platform 84 at one side thereof (FIGURE 10) attached as by screws 86 to brake cylinder 24. Cylinder 24 extends through aperture 85 into the interior of bracket 82 adjacent to the brake drum. As shown in FIGURE 7, cylinder 24 contains a reciprocable piston 88 and fluid chamber 90. The open end of cylinder 24 between the sidewalls thereof and piston 88 is sealed off by an annular rubber cup 92. The central portion of piston 88 is axially recessed externally as at 94 to receive the stem 96 of an arcuate wedge type brake shoe 98 extending into the V-groove 77' of the front disc 77.

It will be noticed in FIGURE 7 that the recess 94 is enlarged in relation to and transversely of the wedge shoe stem 96 to allow displacement of the stem axially of the brake during actuation. The chamber 90 is connected to the master cylinder hydraulic system by a fitting 100 screwed into the inlet port 102 and conduit 23 which leads to the master cylinder 20. Cylinder 20 may be of any conventional type in which the actuation piston (not shown) is connected to the usual brake pedal 22 and depression of the pedal forces hydraulic fluid through conduit 23. Attached to another fitting 106 opposite from the inlet fitting (FIGURE 10) is a conventional bleeder screw 108.

Figure 10:
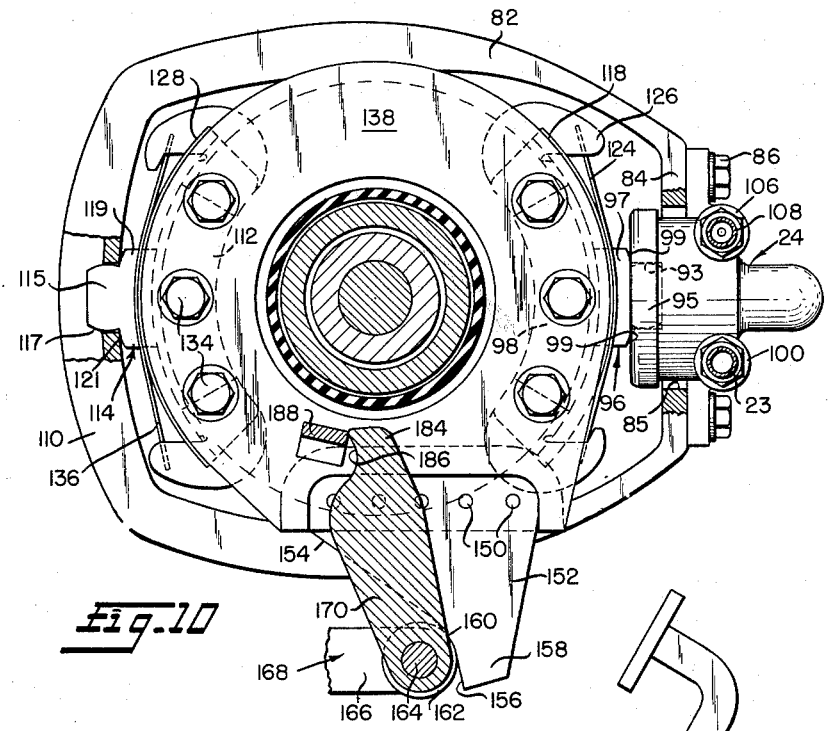
FIGURE 10 is an enlarged section along 10—10 of FIGURE 5 showing the rotatable torque member and lever in increased detail.

The bracket 82 diminishes in width from its widest portion at the platform 84 to a smaller cross section as indicated at 110 in FIGURE 7 to surround the opposite side of the rear disc 79. At this end, diametrically opposite brake shoe 98, bracket 82 is U-shaped in cross section at 111 and another similar wedge type arcuate brake shoe 112 is disposed in the V-groove of disc 79 and has a stem 114 extending slidably into and through aperture 113 in bracket wall 116. As shown in FIGURE 10 the stems 96 and 114 of the brake shoes 98 and 112, respectively, each have reduced radially outer portions 95 and 115 which are provided with convex surfaces 93 and 117, respectively, to allow limited radial rocking movement of the brake shoes relative to their supports, piston 88 and bracket 82.

The reduced shoe portions 95 and 115 of the stems 96 and 114 expand radially inwardly into larger shoe portions 97 and 119, respectively, having likewise convex bearing surfaces 99 and 121, respectively, for rocking purpose of the shoes during brake actuation. The bearing surfaces 99 of the stem 96 provide flanges to abut the underside of the piston 88 and the bearing surfaces 121 of the stem 114 provide similar flanges to abut the inside of the bracket 82 for a purpose to appear.

The larger portion 97 of the stem 96 of brake shoe 98 receives a flanged bracket 118 which has a horizontal portion 120 extending substantially across the width of the front brake disc 77 and closely abutting the friction sections 101 of the brake shoe 98 (FIGURE 7). Extending from the horizontal portion 120 downwardly at right angles thereto laterally outside of the brake disc 77 is an attaching portion 122 secured as by screws 123 to a rotatable plate 138.

A flat leaf type spring 124 confined at its ends in earlike protrusions 126 of the brake shoe 98 and closely surrounding the larger portion 97 of the stem 96 (FIGURE 8) holds that brake shoe normally tight against the bracket 118 in retracted position.

Opposite diametrically from bracket 118 is a similar flanged bracket 128 which however has an axially longer horizontal portion 130 to extend substantially across both brake discs 77 and 79 to receive the larger portion 119 of stem 114 of the brake shoe 112 (FIGURE 7) which is likewise held in close relation to portion 130 in relaxed condition by a leaf spring 136 (FIGURE 9) attached in the same manner as leaf spring 124 for brake shoe 98. Downwardly extending at a right angle from the horizontal portion 130 is a radial portion 132 adjacent the front disc 77 attached as by screws 134 to the rotatable plate 138 (FIGURES 7 and 10).

Rotatable plate 138 is mounted for rotation adjacent the front disc 77 as by means of interfitting threads 140 on its hub 139 and the cylindrical hub 142 of the bearing support 72. Threads 140 may be helical or acme. A seal ring 144 of resilient material is inserted between plate 138 and a radial flange 146 of the bearing support hub 142 adjacent the threads 140 to prevent the entrance of foreign matter and retain lubricant to insure proper lubrication of the threads 140. A sealing annulus 148 is placed between the threaded hub 139 of plate 138 and hub 73 of the brake drum to exclude dirt, moisture and other foreign matter from the interior of the bearing support 72. Plate 138 is adapted to rotate about the axis of shaft 76 in either direction depending on the direction of rotation of the brake drum 78 upon brake application, by means of the connection of plate 138 to the floating brake shoes 98 and 112 by brackets 118 and 128, as will be explained.

With reference to FIGURES 5, 8 and 10, attached rigidly to one side of rotatable plate 138 as by rivets 150 substantially midway between the opposite brake shoes 98 and 112 is a lever 152 adapted to rotate therewith. Lever 152 extends outwardly and downwardly from the brake assembly and has a relatively long inclined edge surface 154 followed by a short more sharply inclined surface 156 that extends down to lever arm tip 158. Approximately at the juncture 160 of these two inclined surfaces 154 and 156 lever 152 engages a bearing roller 162 supported on the pin 164 in the bifurcated end 166 of a piston rod 168 (FIGURE 6).

Pivotally secured to pin 164 adjacent the roller 162 is a cam link 170 extending along and parallel to the lever arm 152 towards the axis of the brake. Cam link 170 is pivoted for rotation approximately midway between its ends, as by an integral cylindrical boss 172 extending from one side thereof into bore 174 of bearing support 72 (FIGURE 5) where it is supported rotatably on a bushing 176 having a flange 178 which extends radially outwardly between the cam link 170 and the outer surface of the bearing support 72 to reduce wear and provide a smooth bearing surface during rotation of cam link 170.

Another integral smaller boss 180 is provided on the same side of the link 170 between pivot 172 and pin 164 which abuts against a rigid projection 182 on bearing support 72 in the released position of the brake to provide a return limit stop for the rod and link assembly. An inwardly extending tip 184 on cam link 170 has a cam face 186 which normally engages a tang 188 integrally struck out of the rotatable plate 138 (FIGURES 5 and 10). As illustrated in FIGURE 10 tang 188 is adapted to rotate link 170 and thereby axially shift rod 168 to the left upon brake actuation when plate 138 rotates in a counterclockwise direction, whereas lever arm 152 is adapted to rotate link 170 and shift rod 168 likewise to the left upon rotation of plate 138 in a clockwise direction. This torque plate embodiment may be incorporated in the brake of FIGURE 3a.

Further referring to FIGURES 6 and 8 the rod 168 extends into a hydraulic power cylinder 34 having a support bracket 192 rigidly attached to transmission housing 30 by bolts 194. Rod 168 is pivotally connected to a piston 196 having a resilient cup 198 at its other end. A sealing ring 200 surrounding piston 196 seals the chamber 202 off against the open end, and the rearward movement of the piston is restricted by a stop plate 204 inserted within the cylinder 34 and abutting a snap ring 206 likewise inserted in the cylinder housing near its open end. The open end of the cylinder between the housing and the piston rod is closed airtight against entry of moisture and dirt by a flexible bellow type boot 208 attached at one end to the rod at 166 and at the other end to the outer wall of cylinder 34 as by a clamp 210. Piston 196 is held in its rearward brake released position, as illustrated in FIGURE 6, by a coil spring 212 compressed between the cup 198 and front wall 190 of cylinder 34.

Adjacent the front wall 190 of cylinder 34 is an outlet 214 communicating with the internal pressure chamber 202 and provided with a fitting 216 attached to a conduit 218 leading into a T-divider 220 secured to the vehicle frame 222 (FIGURE 8) and having connections 224 and 226 (FIGURE 1) to wheel brake cylinders 36 to 42. To provide simultaneous hydraulic fluid pressure actuation for the wheel cylinders 36 to 42 and for safety purposes power cylinder 34 may be connected to the master cylinder 20 by a by-pass conduit 44. Conduit 44 is provided at cylinder 34 with a fitting 228 screwed into a side inlet port 230 (FIGURE 5) approximately at the center of cylinder 34 to provide communication with pressure chamber 202 (FIGURE 6) in front of the piston 196 in the released position of the brake mechanism. Thus, it will be seen that the wheel cylinders, conduits and power cylinder 34 are continuously supplied with hydraulic fluid and under proper predetermined pressure by their direct connection with the brake pedal actuated master cylinder 20, but under brake actuation pressure exerted on the foot pedal will only provide an initial application of the wheel brakes because the directly actuated propeller shaft brake 26 acts immediately through plate 138 to actuate power cylinder 34 to cause the piston 196 to move forward (to the right in FIGURE 6) and thereby close inlet port 230 of by-pass 44, thus cutting off the direct fluid communication between master cylinder 20 and the wheel brakes. A similar arrangement is provided in power cylinder 556 of FIGURE 3a as mentioned before.

In addition, this by-pass at 44 may be used in case of an emergency, of propeller shaft, transmission, or power brake failure in which case the cylinder 34 cannot be actuated. In such case, fluid pressure will be directed from master cylinder 20 through conduit 23, conduit 44 and port 230 into chamber 202 of cylinder 34 without actuation of this cylinder and directly into conduits 218, 224, and 226 to the wheel cylinders 36 to 42.

FIGURE 9 illustrates a different power cylinder in cases where it is more convenient to have the power cylinder mounted remote from the power brake. Here an elongated rod 232 is pivotally attached to the pivoted cam link 170. Rod 232 extends transversely across the vehicle to actuate a power cylinder 234 which is attached to the vehicle frame 222 remote from the propeller shaft or any other drive line power brake. A stop 238 is provided on rod 232 to limit its actuating stroke to a predetermined distance by contacting a frame flange 240. Either cylinder arrangement of FIGURES 8 or 9 or any similar may be employed according to individual installation requirements.

It is a usual practice to use the propeller shaft brake in a roadway vehicle as emergency and parking brake, for which reason this brake is usually equipped with a manually operable mechanism apart from the hydraulic system. In the present invention this arrangement comprises hand lever 32 (FIGURES 1 to 5) operable from the cab of the vehicle (not shown) and which may be pivoted on fixed axis 242 (FIGURE 4) to the vehicle frame or other relatively stationary part. Attached pivotally to the lower part of lever 32 is a short link 244 having its other end pivotally attached to a secondary lever 248. Lever 248 is rotatably mounted at 250 on a stationary part of the vehicle.

Secondary lever 248 has an aperture 252 in the shorter end thereof having convex shaped cam surfaces 254 which abut a boss 256 extending therethrough (FIGURES 5 and 7). Boss 256 is an integral part of a floating link 258 extending from lever 248 toward the brake assembly 26 and which is at its other end pivotally attached to a cam lever 260 (FIGURES 7 and 8). Cam lever 260 is rockably mounted on a relatively fixed support 262 by support leg 264 extending into an aperture 266. Leg 264 provides a convex bearing surface 268 for rocking movement of the leg in aperture 266, and its tip extending inside of support 262 is provided with a tang 270 extending at a right angle therefrom and abutting the inside of support 262 to limit the movement of the cam lever 260 away from the support. Likewise secured in aperture 266 is a spring 272 having an outer flange 274 abutting the outer surface of support 262. Inside the aperture 266 the spring member 272 abuts the rear edge 276 of leg 264 opposite the convex surface 268 and is thus adapted to normally maintain cam lever 260 in its inactive position as illustrated in FIGURE 7.

Cam lever 260 has an arm 278 extending (FIGURE 7) to a tip 280 having convex shaped surfaces 282 for rocking engagement of the arm in an aperture 284 of the stem 286 of an arcuate brake shoe 288. Stem 286 extends freely through support 262 and bracket 128 adjacent stem 114 of brake shoe 112, and the brake shoe 288 extends into the front V-brake disc 77 diametrically opposite brake shoe 98.

With reference to FIGURE 8, it will be noted that the stem 286 of the hand brake shoe 288 is elongated in the radial direction of the brake shoe and circumferentially confined in an aperture 290 of support 262, the surfaces within aperture 290 comprising convex bearing abutments 292 and 294 for providing rocking movement of the brake shoe 288. Tangs 296 on shoe stem 286 limit the inward or outward radial movement of the brake shoe 288, but permit full application of shoe 288 to the drum. Stem 286 is recessed at its side edges at 298 where it extends through an aperture 300 in bracket 128, and aperture 300 is of a large enough dimension to allow rotation of the bracket 128 in either direction upon application of the service brake mechanism without affecting brake shoe 288 of the hand brake mechanism. Likewise, actuation of the hand brake mechanism will not affect the setting of the service brake mechanism. Thus, when hand brake lever 32 is rotated in one direction the secondary lever 248 will be rocked in the other direction to actuate floating link 258 to rock cam lever 260 in a direction to advance brake shoe 288 into the V-groove 77' of the front brake disc 77 for bringing the friction surfaces of brake shoes 288 into contact with the side surfaces of groove 77' thereby preventing or stopping rotation of the disc 77.

Figure 11:
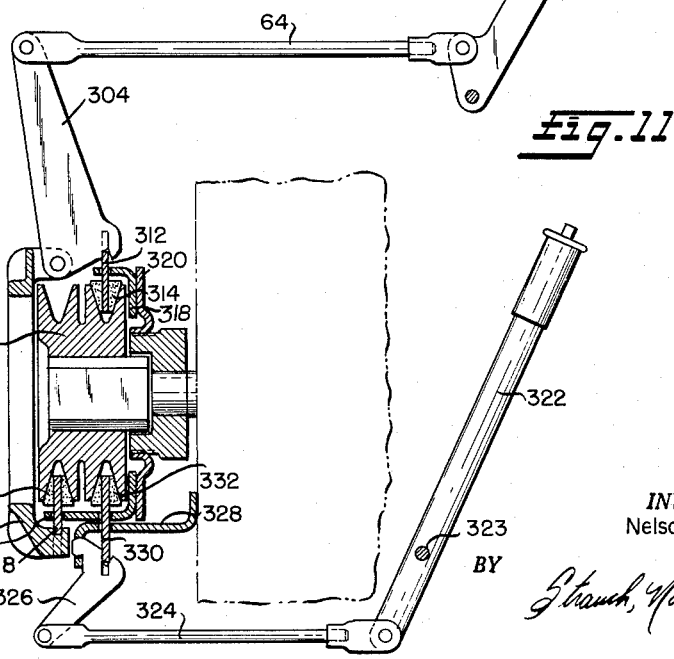
FIGURE 11 is a partly schematic illustration of a mechanically actuated propeller shaft or transmission brake according to an embodiment of the present invention corresponding to the system of FIGURE 3.

In FIGURES 3 and 11 is illustrated an embodiment of the invention having mechanical foot pedal actuation of the brake assembly 66. Here pedal 66 is pivotally attached to link 64 which in turn is pivotally attached to a floating lever 304. One side of lever 304 is pivotally attached to a floating force transmitting bracket 306 which is the equivalent of bracket 82 in the embodiment of FIGURE 7 and which likewise surrounds the brake drum 78. Bracket 306 rockably receives the stem 308 of a brake shoe 310. Lever 304 opposite the pivot connection to bracket 306 is rockably connected to the stem 312 of another brake shoe 314. The stems 308 and 312 of brake shoes 310 and 314, respectively, are similarly confined in attaching brackets 317 and 318, respectively, which are secured to a rotatable torque transfer plate 320 similar to that at 138 in FIGURE 7. For parking or emergency, a hand brake lever 322 is pivoted to the frame at 323 and pivoted to a link 324 to actuate a cam lever 326 which is rockably mounted in a stationary support 328. Cam lever 326 receives rockingly the stem 330 of a brake shoe 332 diametrically opposite brake shoe 314. It will be understood that operation of the hand brake mechanism in this embodiment is likewise independent of the service brake mechanism and similar to that described in connection with FIGURE 7.

Referring once more to FIGURES 7 to 9, it will be seen that the brake drum 78 is provided with a number of axially extending openings 334 disposed between the V-grooves 77' and 81 of brake discs 77 and 79 and the yoke 80, which openings intersect a radial opening 336 between the discs 77 and 79. Openings 334 and 336 permit air to enter the brake drum 78 and circulate beneath and between the V-grooves 77' and 81 for cooling the friction surfaces.

The device operates as follows:

Upon depression of brake pedal 22 master cylinder 20 displaces hydraulic fluid through conduit 23, into propeller shaft or transmission brake cylinder 24. A limited amount of fluid is also displaced through by-pass conduit 44 into chamber 202 of power cylinder 34 and on to the wheel brakes for initial brake application. Piston 88 in cylinder 24 moves towards the brake drum and thereby moves brake shoe 98 into frictional engagement with the V-groove 77' of brake drum disc 77 which is rotating with the propeller or transmission output shaft. Due to the convex rocking surfaces at 93 and 99 brake shoe 98 is allowed to rockably adjust itself to the load conditions.

The reaction forces occurring in cylinder 24 during actuation are transmitted by the floating bracket 82 to which the cylinder is connected to the diagonal oppositely positioned brake shoe 112, that is, the bracket 82 shifts transversely of the brake (to the right in FIGURE 10) thereby moving brake shoe 114 into frictional engagement with the V-groove 81 of the other rotating disc 79 of brake drum 78. The convex shaped surfaces 117 of the stem 114 of brake shoe 112 permit self-adjustment of this shoe under load.

The torque reaction forces of the brake during actuation are effective on the brackets 118 and 128 due to their connection to the stems 96 and 114 of brake shoes 98 and 112 and because of the floating assembly of the bracket 82 which allows it to rotate under force. This force is transmitted by brackets 118 and 128 to the rotatable torque plate 138 which is thereby rotated and when rotating in a clockwise direction as viewed in FIGURE 10, actuates piston rod 168 by means of lever 152 attached to plate 138 and roller 162 attached to the clevis end 166 of piston rod 168. When rotating in counterclockwise direction, as viewed in FIGURE 10, the integral tang 188 of plate 138 rotates the pivot link 170 to actuate the piston rod 168, whereas the attached lever arm 152 moves away in the opposite direction. Actuation of piston rod 168 causes piston 196 to move forward and thereby exert additional pressure on the fluid in the system through conduits 218, 224 and 226 to the wheel cylinders. Inlet port 230 of the master cylinder connected to conduit 44 is thereby gradually closed to prevent pressure build-up so that the final brake application and holding force is wholly provided by the reaction force of brake 26. Upon release of pedal pressure all parts are returned to their normal position by the various conventional type return springs provided in the power cylinders and on the brake shoes. The setting of the mechanical hand brake will in no way be affected during service brake application. Operation of the embodiment in FIGURE 11 is similar to the hydraulic embodiment described.

The conduits 23 leading from the master cylinder 20 to the cylinder 24 are preferably flexible to permit displacement during brake actuation, and it is also preferred to provide an automatic adjustment in the cylinder 24 which need not further be described to allow a constant relatively short pedal stroke.

Bracket 82 is effectively floatingly supported in the assembly by the brake shoe stems 96 and 114. When the cylinder 24 is actuated to engage brake shoes 98 and 112 with the brake drum, bracket 82 floats laterally to equalize the brake shoe application pressures on opposite sides of the drum, this being permitted by its radially displaceable association with the brake shoe stems.

As the brake shoes grip the rotating drum, the entire assembly of shoes 98 and 112, bracket 82 and plate 138 will be rotated by the torque reaction force, and the rotating plate 138 applies this force, through lever 152 or link 170 depending on the direction of drum rotation, to actuate power cylinder 34 to augment fluid pressure for application of the wheel brakes. It will be appreciated that as plate 138 rocks it is slightly axially displaced, but the brake shoe stems have sufficient clearance in the axial direction that this displacement is of negligible effect.

During the foregoing operation the brake shoe 288 of the hand brake mechanism remains retracted, and the opening 300 in bracket 128 is of such circumferential extent that rocking of the plate 138 does not affect shoe 288. Application of the propeller shaft or transmission brake as a parking brake is effected by hand lever 32 acting through links 244, 248 and 258, and this does not apply the wheel brakes.

Thus, as the brake shoes 98 and 112 engage the drum, they at first have negligible effect on reducing propeller or transmission shaft rotation, but as soon as they have been rocked to the position where the torque reaction force is transferred to the wheel brakes and the brake shoe mount becomes effectively solid with the vehicle frame then the shoes 98 and 112 exert appreciable frictional resistance to turning of the propeller or transmission shaft, and the combined effect of the power assisted service brakes at the wheels and the vehicle transmission braking is extremely efficient, although requiring only a minimum of physical effort.

The effectiveness of this brake mechanism will not be altered due to atmospheric conditions at changing altitudes as, for instance, in the case of a vacuum assisted power brake. The input and holding force required at the brake pedal will only be that for one brake instead of the usual force required to apply four or more wheel brakes.

Referring now to FIGURES 12–17, which shows a one brake drum embodiment for both parking and power brake application, the brake assembly is indicated at 400. The brake drum 401 is secured to rotate with the propeller or transmission output shaft 76. This drum preferably has two diametrically opposed brake shoes engaging its periphery.

A hydraulic cylinder 402, corresponding to that at 24 in FIGURE 10, is mounted on the floating strut bracket 403 corresponding to that at 82 in FIGURE 10. An inlet 404 is provided for hydraulic fluid to enter cylinder 402 to actuate piston 406 to apply the brake shoes (not shown) to the drum in the same manner essentially as in FIGURE 10, bracket 403 floating like bracket 82.

Piston 406 has a projecting stem 408 abutting a cam surface 410 on a lever 412 pivoted at 414 on a support 416 which is rigid with the transmission housing 428 or some other stationary part. Lever 412 is pivotally attached by clevis 418 to one end of cable 420 passing through a sheath 421 supported by guide clip 422 on the floating bracket 403. At its other end cable sheath 421 is secured to an arm 424 that is pivoted on the transmission housing at 426 and provided with an arcuate slot 430 through which extends an adjustment holding screw 432. Thus slack in the cable may be taken up by adjustment of arm 424 to a new position locked by screw 432.

The motion transmitting cable 420 is secured at this other end to a clevis 433 pivoted upon the lower end of a manually operated brake lever 434.

A power cylinder 436 is attached to a stationary part such as the transmission housing, as by bolts 437. Cylinder 436 comprises a main housing 438 enclosing a cylinder in which a piston 442 is slidably mounted to provide a pressure chamber 440. Piston 442 is actuated by a rod 441, suitably connected to a rotatable plate 138 as in FIGURE 10, or to a torque plate which will be later described in connection with FIGURE 12.

Incorporation of the parking brake in the service brake hookup requires a special open fluid system in the power cylinder so that the fluid system will not be under pressure during parking. This is illustrated in FIGURES 15, 15a to 17, 17a.

Referring to FIGURE 17 which shows the power cylinder 436 in cross section an integral projecting section 444 of housing 438 contains a cylindrical chamber 445 in which slides a valve actuating piston 446 that is biased to the left by coiled compression spring 448. The outer end of the spring 448 abuts a closure cap 450 having a vent orifice 452. Piston 446 is formed with an annular longitudinal recess 454 for a purpose to appear.

Housing 438 extends integrally beyond section 444 to an enlarged section 456 having a threaded wall surface recess 457 into which is screwed a cup 458. Cup 458 encloses an expansion chamber 460 containing a free piston 462 biased downwardly in FIGURE 17 by a coiled compression spring 464.

A smaller diameter threaded wall recess 461 essentially countersunk coaxially in the bottom of recess 457 has screwed into it a smaller cup 466 which also contains a free piston 468 biased downwardly by compression spring 470. Valve stem 472 projects slidably downwardly through a bore 474 to enter cylinder 445 and abut the side of piston 446 under the biasing force of spring 470.

The upper end of bore 474 surrounding the valve stem is enlarged to provide an annular chamber 478, and chamber 478 (FIGURE 17a) is in communication with a radial passage 480 leading to bleeder valve 482. A cross passage 484 connects passage 480 to the expansion chamber 460 at the bottom side of piston 462.

A transverse passage 486 connects chamber 465 within cup 466 to the pressure chamber 440 in by-pass relation to cylinder 445.

As shown in the neutral condition of FIGURE 15 valve 468 is normally held in raised or open position by abutment of stem 472 with the cylindrical periphery of piston 446, so that small cup chamber 465, which is in constant fluid communication with pressure chamber 440 through passage 486, is in fluid communication through passages 480 and 484 with the expansion chamber 460. Normal pressure from chamber 440 is not sufficient to displace piston 462 upwardly in FIGURE 15.

A pressure fluid inlet conduit 488 is coupled to a housing passage 490 opening to the left of piston 442 in FIGURE 15. Conduit 488 is connected at its other end to the master cylinder of the service brake such as master cylinder 20 of FIGURE 1, so that master cylinder developed fluid pressure is applied through conduit 488 to displace piston 442 to the right in FIGURE 15.

With reference to FIGURE 15a, a housing boss 494 contains a passage 496 leading from pressure chamber 440 to a conduit 502 that is connected to supply fluid under pressure to the wheel cylinder brakes, as to the cylinder 34 in FIGURE 1.

FIGURES 15 and 15a show the parts in neutral position, as where the service brake is not applied. Piston 446 holds valve 468 in open position so that the pressure of chamber 440 is communicated to both chambers 465 and 460 with all of these chambers and passages filled with hydraulic fluid. Piston 462 is in its lowermost biased position, and piston 442 is at its outermost position to the left in the pressure chamber 440.

FIGURES 16 and 16a show the positions of the parts when the hydraulic fluid through inlet 404 is supplied to cylinder 400 of FIGURE 12, and at the same time is supplied through conduit 488 to the left side of valve control piston 446. As piston 446 moves to the right in FIGURE 16, recess 454 permits the valve stem 472 to be downwardly displaced by spring 470 thereby closing valve 468. As piston 442 is displaced to the right the fluid under pressure developed in chamber 440 will discharge only through conduit 502 to the wheel cylinders. Excess pressure trapped by the closing of valve 468 will bleed at 482. When the hydraulic pressure in the service brake system is released, the parts will all restore from the FIGURE 16 to FIGURE 15 position.

When it is desired to use the parking brake alone, a pull is exerted on cable 420 through lever 434. This rocks lever 412 to cause cam surface 410 to shift piston 406 and apply the brake shoes.

I prevent buildup of fluid pressure in the power cylinder by the condition shown in FIGURES 17 and 17a. Since no fluid under pressure is now supplied through conduit 488, the valve control piston 446 remains as in FIGURES 15 and 17 and the valve 468 remains open. Thus when piston 442 moves to the right in FIGURE 17 fluid is diverted to flow through passage 486, chamber 465, open valve 468, passages 480 and 484, and into chamber 460 where the increasing pressure forces piston 462 upwardly against the bias of spring 464, thereby relieving the line to the wheel cylinders of pressure. When the hand brake lever is released, the parts reassume the FIGURE 15 condition.

This arrangement provides that the same brake may be used as the parking brake and the power brake without having the parking brake actuation influence the wheel brakes.

Referring to FIGURES 12 and 14, piston rod 441 is pivotally connected at 504 to a lever 506 which is pivoted at 508 to a rockable torque plate 510 which is mounted and operated essentially the same as plate 138. Lever 506 abuts slidably intermediate its ends against a pin 512 which is stationarily mounted on the brake support 513 as by screw 514 (FIGURE 14). Clockwise rotation of plate 510 results in lever 506 rocking counterclockwise to push piston 442 to the right in FIGURE 12. Pin 512 projects through an arcuate slot 518 in plate 510 of sufficient extent that the pin does not hamper rocking of plate 510. This torque plate structure may also be incorporated in the brake of FIGURE 3a instead of the torque plate structure 138 of FIGURE 10.

Counterclockwise rotation of plate 510 in FIGURE 12 causes lever 506 to move away from pin 512, but roller 505 at the end of piston rod 441 is engaged by plate 510 to impart displacement of piston 442 to the right in FIGURE 12.

Pin 512 coacting with slot 518 provides also an anchor for the parking brake operation.

Referring also to FIGURES 12 and 14, the piston rod 441 is provided at its left end with an arcuate ocean wave spring washer 522 which upon a predetermined amount of brake lining wear abuts the stationary stop ring 524, and this can be felt by the operator to tell him his wheel brakes need mechanical adjustment. Also a switch controlling a warning light visible to the operator may be provided with engaging contacts on 522 and 524 for the same purpose.

Thus, there has been provided a novel power assisted braking system for vehicles which in general embodies and utilizes present structures without the expense and added weight of a conventional vacuum assisted power brake system.

The present invention may be embodied in other specific forms without departing from the essential characteristic and spirit thereof; the present embodiment, therefore, is to be considered in all respects as illustrative only and not restrictive, the scope of the invention being indicated by the appended claims rather than by the foregoing description.

What is claimed and desired to be secured by the United States Letters Patent is:

1. In a braking system for a vehicle having a drive line mounted brake assembly and a set of hydraulic wheel brakes, an operator controlled master cylinder connected to actuate said wheel brakes and said drive line mounted brake assembly, said drive line mounted brake assembly comprising a member mounted for limited rotation, a brake shoe movably mounted on said member and adapted for engagement with a brake drum on said drive line, said master cylinder when operated advancing said shoe into frictional contact with the drum, said member being rotated by the torque reaction force developed when said shoe engages the drum, a hydraulic cylinder containing a piston, means connecting said hydraulic cylinder to actuate said wheel brakes independently of said master cylinder, and a motion transmitting connection between said rotating member and said piston for displacing said piston in a constant direction regardless of the direction of rotation of said member.

2. In the braking system defined in claim 1, said drive line mounted brake assembly comprising further a bracket surrounding the brake drum and mounted to float transversely of the axis of said brake drum, a hydraulic cylinder on said bracket operatively connected to at least one of said shoes, and a radially slidable substantially non-rotatable connection between each of said shoes and said rotatable member.

3. In a braking system for a vehicle having a drive line power brake unit and a set of hydraulically operated wheel brakes, said drive line hydraulic power brake unit comprising a drum rotatable with the drive line and a brake shoe movable to engage the drum, a support on which said shoe is movably mounted, means for moving said shoe into frictional engagement with the drum comprising a hydraulic cylinder mounted for floating displacement substantially transversely of said brake drum and having a piston operably connected to said shoe, a pedal actuated master cylinder having a flexible conduit connection to said hydraulic cylinder in the drive line power brake assembly, said support being mounted for rotating movement so that when said shoe is advanced to engage the drum said support is correspondingly rotated, a hydraulic power actuator for said wheel brakes, and a motion transmitting connection between said rotating support and said power actuator so that said rotating of said support power actuates said wheel brakes.

4. In the braking system defined in claim 3, a hydraulic fluid circuit between said hydraulic power actuator and said wheel brakes, and a connection between said conduit and said power actuator to by-pass said drive line hydraulic power brake assembly, said by-pass connection being closed when said power actuator is operated by rotation of said support.

5. In the braking system defined in claim 3, said brake shoe being supported for movement substantially radially of said drum and being slidably connected to both said rotating support and the mount of said hydraulic cylinder for the drive line power brake assembly.

6. In a braking system for a vehicle having ground engaging wheels equipped with hydraulic brake units in circuit with a power actuator; a drive line equipped with a hydraulic power brake unit, said drive line power brake unit comprising a rotatable drum, opposed brake shoes adapted to frictionally engage said drum, a support rotatably mounted for movement about the axis of said drum, said shoes being slidably connected to said support for movement substantially radially of said drum, a transversely floating member carrying the hydraulic cylinder of said drive line power brake unit, manual means independent of said power actuator for actuating said hydraulic cylinder of the drive line power brake unit, means providing an operative connection between said hydraulic cylinder and one of said brake shoes and means movably connecting the other of said brake shoes to said floating member to equalize application of said shoes when said hydraulic cylinder is energized, and a motion transmitting connection between said rotatable support and said power actuator for utilizing the drive line power brake torque reaction to power actuate the wheel brakes.

7. In the braking system defined in claim 6, another movable brake shoe in said drive line power brake unit, and manually operable means for shifting said other brake shoe into frictional engagement with the drum independently of said opposed brake shoes.

8. In the braking system defined in claim 6, said floating member being an annular bracket surrounding said brake drum and essentially carried by said brake shoes.

9. In a braking system for a vehicle having ground engaging wheels equipped with hydraulic brake units and a drive line shaft equipped with a hydraulic brake unit, means under control of the vehicle operator for simultaneously supplying hydraulic fluid under pressure directly to the drive line shaft hydraulic brake unit and said hydraulic brake units, further hydraulic actuator means for said wheel brakes, and means for applying the torque reaction force derived from application of said drive line brake for power actuation of said further hydraulic actuator means to apply said wheel brakes and for blocking direct supply of hydraulic fluid from said operator controlled means to said hydraulic wheel brake units so that final application of the wheel brakes is substantially solely under torque reaction derived force.

10. In a hydraulic braking system for a vehicle having a master cylinder and hydraulically operated wheel brakes normally connected to be operated thereby, a drive line brake comprising a drum rotatable with said drive line, floating brake shoes adapted to frictionally engage said brake drum, actuator means for said brake shoes connected to said master cylinder, said actuator means and brake shoes being supported on a rotatable support plate coaxial with said brake drum, a power cylinder, a piston in said power cylinder having a piston rod extending outwardly therefrom attached to a pivoted link, first and second abutment means on said rotatable support plate adapted to pivot said pivoted link so that upon rotation of said support plate in one direction when said drive line brake is actuated, said piston is actuated by said first abutment means and upon rotation of said support plate in the other direction said piston is actuated by said second abutment, means providing a direct hydraulic connection between said power cylinder and said wheel brakes whereby said wheel brakes may be actuated by the force developed in said power cylinder, and means effective when said piston and said power cylinder are actuated to block the connection between said master cylinder and said wheel brakes.

11. In a braking system for a vehicle having a set of hydraulically operated wheel brakes, a drive line brake, said drive line brake having a part mounted for limited displacement away from a neutral position by torque when said drive line brake is applied, a pedal actuated operator for applying said drive line brake and said wheel brakes, a separate power actuator for said wheel brakes, means connecting said displaceable part to said separate power actuator to energize said power actuator and thereby actuate said wheel brakes when said part is displaced away from its neutral position in either direction by torque upon application of said drive line brake, and means effective when said power actuator is energized to disconnect said pedal actuated operator from said wheel brakes whereby said wheel brakes are actuated thereafter solely by said separate power actuator.

12. In the braking system defined in claim 9, said drive line shaft hydraulic brake unit having a hydraulic cylinder, a pedal operated hydraulic master cylinder connected by a conduit to said hydraulic cylinder, and said further hydraulic actuator means comprising a power cylinder having a piston working in a chamber, and a by-pass connection from said conduit having an inlet to said chamber, said piston being displaced by said torque reaction force and adapted after predetermined displacement to close said inlet.

13. In a vehicle braking system defined in claim 10, said actuator means comprising a hydraulic cylinder connected to said master cylinder to actuate one of said brake shoes and attached to a floating strut surrounding said brake drum and abutting the other of said brake shoes so that upon actuation of said cylinder to operate said one shoe the floating strut will be displaced due to the reaction forces of said one brake shoe application to apply said other brake shoe.

14. In the vehicle braking system defined in claim 13, said actuator means including mechanical actuation means independent of the hydraulic actuation and comprising a piston in said cylinder having a rod extending outwardly therefrom and abutting a cam surface of a pivoted lever attached to a manually operable cable connection to actuate said piston independent of said hydraulic system.

15. In the vehicle braking system defined in claim 10, said actuator means comprising first and second hydraulic cylinders oppositely supported on said rotatable support plate, said first cylinder being connected to said master cylinder and said second cylinder being connected to said first cylinder so that upon actuation of said master cylinder both said first and second cylinders will be actuated simultaneously, said first cylinder further being connected to said power cylinder to provide a direct connection between said master cylinder and said power cylinder.

References Cited in the file of this patent

UNITED STATES PATENTS

| | | |
|---|---|---|
| 1,732,309 | Loughead | Oct. 22, 1929 |
| 2,106,758 | Oliver | Feb. 1, 1938 |
| 2,859,839 | Throne | Nov. 11, 1958 |
| 2,975,871 | Eckardt | Mar. 21, 1961 |
| 3,044,580 | Butler | July 17, 1962 |

FOREIGN PATENTS

| | | |
|---|---|---|
| 638,332 | Great Britain | June 7, 1950 |

UNITED STATES PATENT OFFICE
CERTIFICATE OF CORRECTION

Patent No. 3,167,158 January 26, 1965

Nelson R. Brownyer

It is hereby certified that error appears in the above numbered patent requiring correction and that the said Letters Patent should read as corrected below.

Column 5, line 66, for "respondnig to the system of FIGURE 3;" read -- connection with cylinder 68 in FIGURE 3. --; column 15, line 40, strike out "hydraulic"; line 60, before "power" insert -- hydraulic --; same column 15, lines 60 and 61, strike out "hydraulic --.

Signed and sealed this 28th day of September 1965.

(SEAL)
Attest:

ERNEST W. SWIDER
Attesting Officer

EDWARD J. BRENNER
Commissioner of Patents